United States Patent
Kawai et al.

(10) Patent No.: US 7,810,728 B2
(45) Date of Patent: Oct. 12, 2010

(54) MICR READER

(75) Inventors: Masayoshi Kawai, Kahoku (JP);
Yasuhiko Kitagawa, Kahoku (JP)

(73) Assignee: Pfu Limited, Ishikawa (JP)

( * ) Notice: Subject to any disclaimer, the term of this patent is extended or adjusted under 35 U.S.C. 154(b) by 1142 days.

(21) Appl. No.: 11/356,086

(22) Filed: Feb. 17, 2006

(65) Prior Publication Data
US 2006/0196940 A1   Sep. 7, 2006

(30) Foreign Application Priority Data
Feb. 18, 2005  (JP) ............................ P2005-042012

(51) Int. Cl.
*G06K 7/08* (2006.01)
(52) U.S. Cl. ..................... 235/449; 235/453
(58) Field of Classification Search .................. 235/449, 235/453, 454, 379
See application file for complete search history.

(56) References Cited

U.S. PATENT DOCUMENTS

| | | | | |
|---|---|---|---|---|
| 4,921,279 A | * | 5/1990 | Hanna | ..................... 283/67 |
| 5,613,783 A | * | 3/1997 | Kinney et al. | ................. 400/73 |
| 5,893,667 A | * | 4/1999 | Kinney et al. | ................. 400/73 |
| 6,068,187 A | * | 5/2000 | Momose | ..................... 235/449 |
| 6,259,808 B1 | * | 7/2001 | Martinez et al. | ............ 382/139 |
| 7,090,130 B2 | * | 8/2006 | DeLand et al. | .............. 235/449 |
| 2008/0149708 A1 | * | 6/2008 | Beskitt et al. | ............... 235/379 |

FOREIGN PATENT DOCUMENTS

| | | |
|---|---|---|
| DE | 33 47 632 | 12/1983 |
| EP | 0 603 591 | 11/1993 |
| JP | 1-192628 | 8/1989 |
| JP | 10-187877 | 7/1998 |
| JP | 2001-283401 | 10/2001 |

OTHER PUBLICATIONS

German Patent Office Action, mailed Dec. 20, 2008 and issued in corresponding German Patent Application No. 10 2006 007 400.9.

* cited by examiner

*Primary Examiner*—Ahshik Kim

(57) ABSTRACT

A MICR reading head is operable to read a MICR character printed on a medium fed in a first direction. A sensor is operable to detect an end portion in a second direction perpendicular to the first direction of the medium. The MICR reading head is movable to a predetermined position at a predetermined distance from the end portion detected by the sensor.

14 Claims, 4 Drawing Sheets

MICR READER

BACKGROUND OF THE INVENTION

The present invention relates to a MICR reading mechanism for reading MICR characters printed with a special magnetic ink, and concerns the realization of the accurate reading of MICR characters by a scanner having a center paper feeding mechanism.

MICR (magnetic ink character recognition) characters are such that the position on the paper (medium) where the characters are to be printed has been determined by standards, and that which constitutes its reference is the distance from an end portion of the printed paper in a direction (width direction) perpendicular to a feeding direction in which the paper fed. In addition, the sizes of the characters have also been determined by the standards. When the MICR characters are read, it must be ensured that the characters pass over the reading head in conformity with the position and the size prescribed in these standards.

In the case of a scanner having a center paper feeding mechanism, it is necessary to set the center paper feeding mechanism in the state such as the one shown in FIG. 4A.

Related MICR reading mechanisms for reaching MICR characters are in many cases exclusive-use devices (refer to JP-A-1-192628), and in order to read the MICR characters printed at a predetermined position on the paper in a skewless state, the printed paper is abutted against an abutment plate, so as to read them in a state which is free of skew or the like.

Here, with a related scanner having the center paper feeding mechanism, the end portion in the width direction of the paper serving as a reference for a position where the MICR characters are printed is not fixed, as shown in FIG. 4C. Therefore, since the MICR characters do not pass over the MICR reading head, reading has been impossible.

In addition, in a case where documents with different sizes are loaded in a mixed form, the end portions in the width direction serving as the reference for the position where the MICR characters are printed are misaligned. Therefore, since the MICR characters do not pass over the MICR reading head, reading has been impossible.

In addition, with a related scanner having the center paper feeding mechanism, there are cases where the paper skews, as shown in FIG. 4B, so that there have been cases where reading fails.

As described above, the following problems are encountered with the related art.

With a related scanner having the center paper feeding mechanism, which is not a reader exclusively used for MICR characters, the end portion in the width direction of the paper serving as the reference for the printing position of the MICR characters is not fixed but moves. Therefore, it is impossible to allow the MICR characters to accurately pass over the MICR reading head, making reading impossible.

In particular, in cases where documents of different paper sizes are loaded in a mixed form, the end portions in the width direction of the paper serving as the reference for the printing position of the MICR characters become misaligned for each sheet of paper, so that reading has been impossible.

SUMMARY OF THE INVENTION

It is therefore an object of the invention to provide a MICR reading mechanism for reading the MICR characters with accuracy in the scanner having the center paper feeding mechanism, and for reading the MICR characters with accuracy even in cases where documents of different paper sizes are loaded in a mixed form.

In order to achieve the object, according to the invention, there is provided a MICR reader having:

a MICR reading head, operable to read a MICR character printed on a medium fed in a first direction; and a sensor, operable to detect an end portion in a second direction perpendicular to the first direction of the medium.

The MICR reading head is movable to a predetermined position at a predetermined distance from the end portion detected by the sensor.

With this configuration, it becomes possible to accurately read the MICR characters in the scanner having the feeder. In addition, it becomes possible to accurately read the MICR characters as the MICR reading head is moved to an appropriate position, even in cases where documents of different paper sizes are loaded in a mixed form.

The MICR reading head may be displaced from the sensor at the predetermined distance in the second direction.

The MICR reader may further have a pressure application roller, operable to bring the medium into close contact with the MICR reading head. The pressure application roller may be prevented from coming into contact with the MICR reading head when the MICR reading head is moved.

The MICR reader may further have a pressure applier, operable to bring the medium into close contact with the MICR reading head.

The MICR reader may further have a contact prevention member, operable to prevent the pressure applier from coming into contact with the MICR reading head when the MICR reading head is moved.

The MICR reader may further have a connecting member, connected to the MICR reader and the sensor.

The predetermined position may correspond to a position of the medium on which the MICR character is printed in the first direction.

The MICR reader may further have a correction member, operable to correct a skew of the medium.

The correction member may include: a first feeder, adapted to feed the paper in a first direction; and a second feeder, adapted to feed the paper in the first direction, and disposed at an upstream side of the first roller in the first direction.

According the invention, there is also provided a method of reading a MICR character printed on a medium fed in a first direction by MICR reading head, having:

detecting an end portion in a second direction perpendicular to the first direction of the medium; and moving the MICR reading head to a predetermined position at a predetermined distance from the detected end portion.

The method may further have bringing the medium into close contact with the MICR reading head by a pressure applier.

The method may further have preventing the pressure applier from coming into contact with the MICR reading head.

The method may further have correcting a skew of the medium.

DETAIL DESCRIPTION OF PREFERRED EMBODIMENTS

Figure 1:
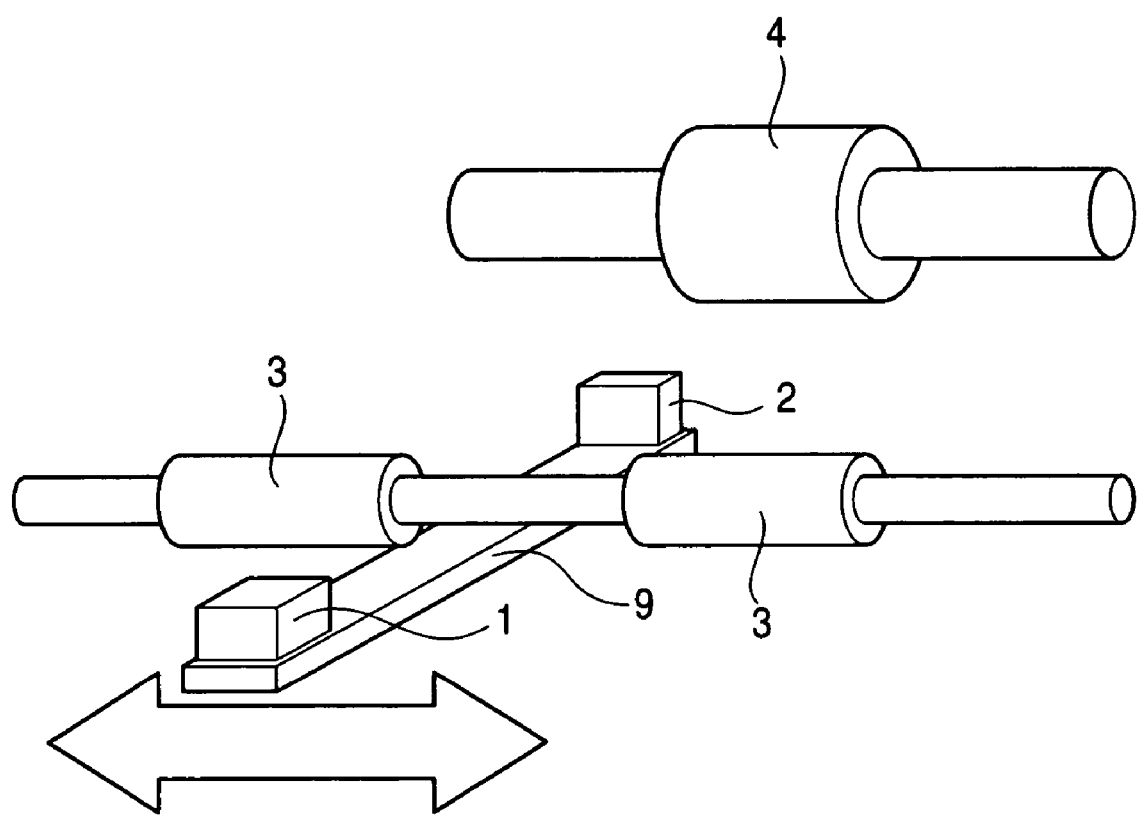
FIG. 1 is a diagram explaining the basic principle of the invention.

The following embodiment is adopted in the invention.

An arrangement is provided such that at the time of feeding papers (media) in a feeding direction, which are stacked in a hopper, an end portion of the paper in a direction (width direction) perpendicular to the feeding direction is detected by a sensor, such as a contact type sensor or an optical non-contact type sensor, and a MICR reading head is moved to a position spaced apart a predetermined distance from the end portion in the width direction of the document serving as a reference.

In fact, the MICR reading head is displaced from the sensor at the predetermined distance in the width direction. Therefore, the MICR reading head can move to a position at which the MICR reading head can read the MICR characters at the time the end portion of the paper is detected by the sensor.

As a result, even in cases where the end portion in the width direction of the paper is not fixed but changes, the distance from the end portion in the width direction serving as the reference where the MICR characters are printed can be accurately measure, and the MICR reading head can be moved to immediately below the MICR characters, thereby making it possible to accurately read the MICR characters.

An arrangement is provided such that, at this time, to ensure that the paper does not skew, overfeed control is provided by abutting a leading end portion of the paper against a feed roller so as to correct the skew of the paper.

As a result, it becomes possible to prevent the occurrence of an error in reading the MICR characters owing to the skew of the paper.

In the case where the MICR reading head is moved to a predetermined position, if the MICR reading head is moved in a state in which pressure is kept applied to a pressure application roller for bringing the paper into close contact with the head so as to reach the MICR characters, the MICR reading head becomes worn. To prevent this, an arrangement is provided such that the application of pressure of the pressure application roller is canceled at the time of the movement of the MICR reading head.

As a result, it is possible to ensure that the wear of the head due to the pressure application roller does not occur during the movement of the MICR reading head, thereby making it possible to prevent the short life of the MICR reading head.

Embodiment

Referring to the drawings, a description will be given of an embodiment in accordance with the invention. It should be noted that in the description below, the same portions are denoted by the same reference numerals, and a detailed description thereof will be omitted in some cases.

Figure 2:
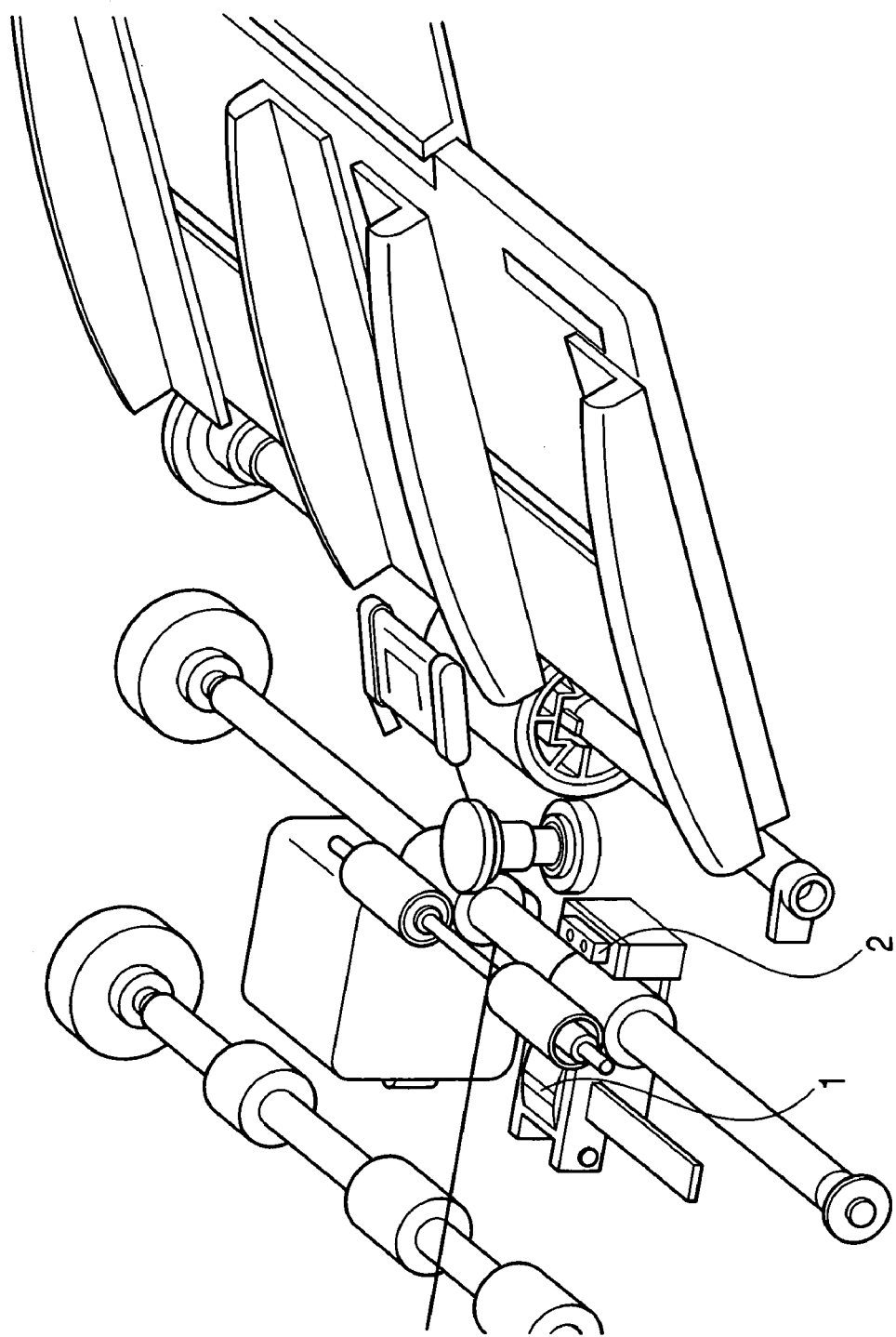
FIG. 2 is a diagram illustrating an embodiment of the invention.

As shown in FIGS. 1 and 2, the paper fed by a feed roller 4 and transported by transport rollers 3 has its end portion in the width direction detected by a sensor 2 for detecting an end portion in the width direction of the paper.

As a result, a MICR reading head 1 connected to the sensor 2 by a connecting member 9, for detecting an end portion in the width direction of the paper is moved from the detected end portion in the width direction of the paper so that the MICR characters printed at a predetermined position set forth by the standards pass over the MICR reading head 1. At this time, the MICR reading head 1 is displaced from the sensor 2 at a predetermined distance that is a distance between the predetermined position and the end portion in the width direction on the connecting member 9. The MICR reading head 1, the connecting member 9 and the sensor 2 are integrally moved in the width direction.

Figure 3:
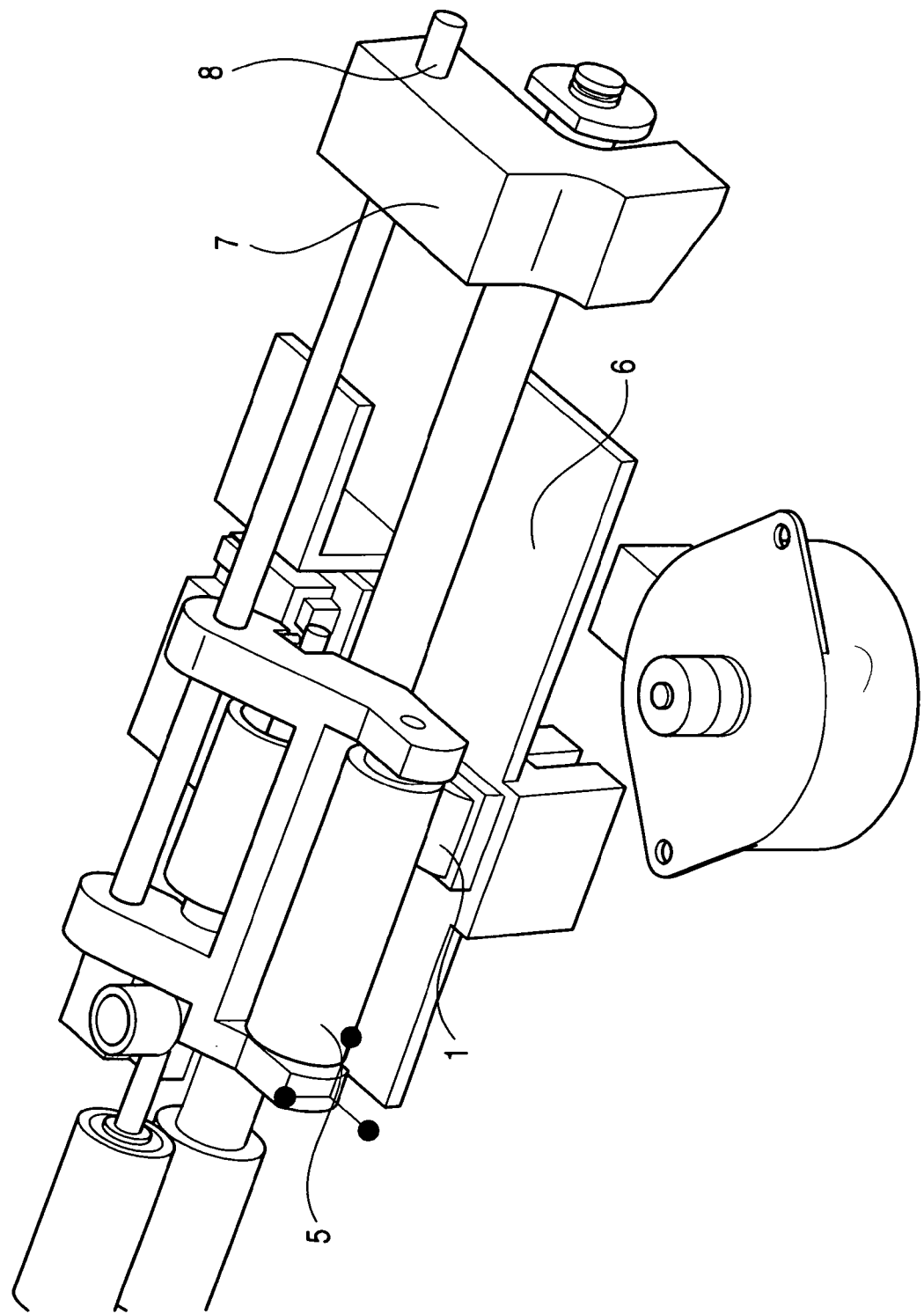
FIG. 3 is a diagram explaining the operation of a pressure application roller.
Figure 4A:
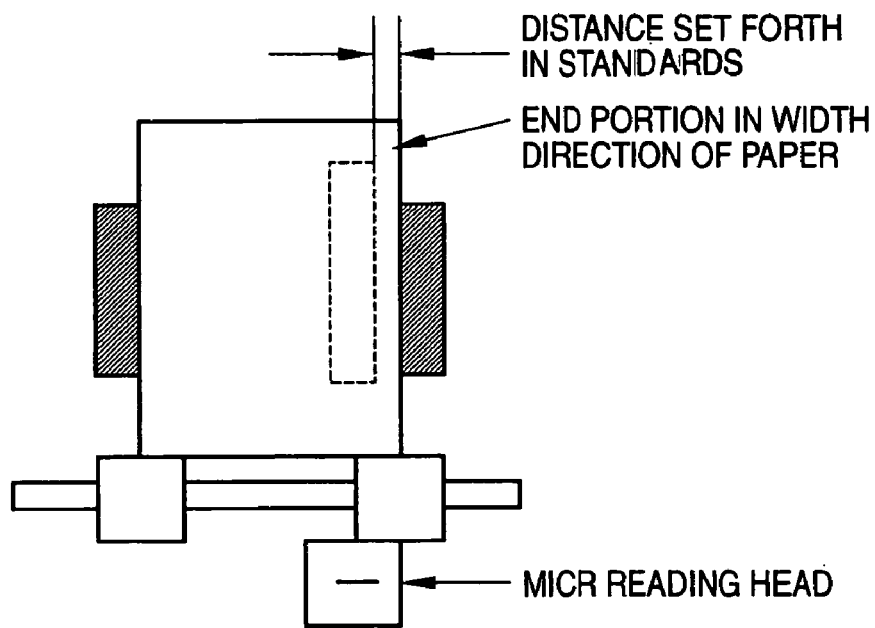
FIGS. 4A to 4C are diagrams explaining MICR reading by a center paper feeding mechanism.
Figure 4B:
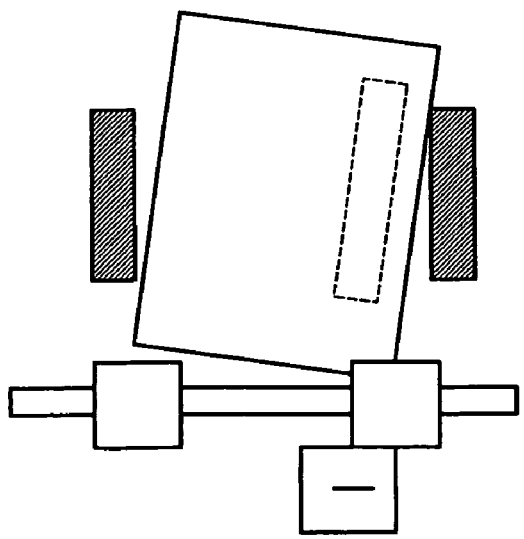
Figure 4C:
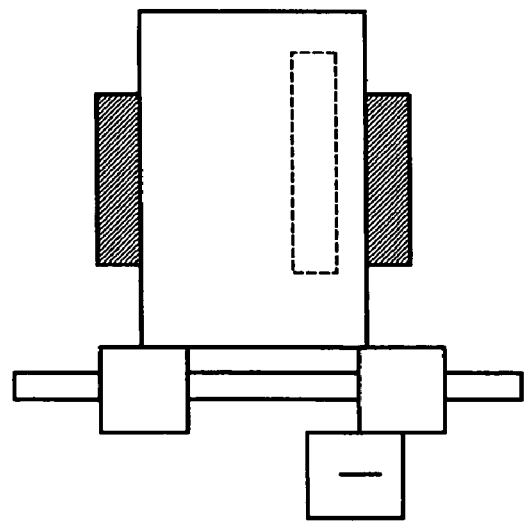

As shown in FIG. 3, the MICR reading head 1 is provided with a pressure application roller 5 to bring the paper into close contact with the head by applying pressure from above. It is conceivable that the head becomes worn when this pressure application roller 5 comes into contact with the MICR reading head 1 when the MICR reading head 1 is moved.

To prevent such wear, as shown in FIG. 3, a MICR reading head case 6 is also moved together with the movement of the MICR reading head 1 and is brought into contact with a roller raising-up cam 7, and the application of pressure by the pressure application roller 5 is canceled by changing the angle of the roller raising-up cam 7 by using a fulcrum 8 as a center.

In addition, control is provided such that the paper is abutted against the feed roller 4 to correct the skew by overfeeding by a paper feed roller which is not shown in FIG. 1 and is disposed at an upstream side of the feed roller 4 in the feeding direction.

What is claimed is:

1. A MICR (magnetic ink character recognition) reader comprising:
   a MICR reading head, operable to read a MICR character printed on a medium fed in a first direction; and
   a sensor, operable to detect an end portion in a second direction perpendicular to the first direction of the medium, wherein
   the MICR reading head is movable to a predetermined position at a predetermined distance from the end portion detected by the sensor.

2. The MICR reader according to claim 1, wherein
   the MICR reading head is displaced from the sensor at the predetermined distance in the second direction.

3. The MICR reader according to claim 1, further comprising
   a pressure application roller, operable to bring the medium into close contact with the MICR reading head, wherein
   the pressure application roller is prevented from coming into contact with the MICR reading head when the MICR reading head is moved.

4. The MICR reader according to claim 1, further comprising
   a pressure applier, operable to bring the medium into close contact with the MICR reading head.

5. The MICR reader according to claim 4, further comprising
   a contact prevention member, operable to prevent the pressure applier from coming into contact with the MICR reading head when the MICR reading head is moved.

6. The MICR reader according to claim 1, further comprising
   a connecting member, connected to the MICR reader and the sensor.

7. The MICR reader according to claim 1, wherein
   the predetermined position corresponds to a position of the medium on which the MICR character is printed in the first direction.

8. The MICR reader according to claim 1, further comprising
   a correction member, operable to correct a skew of the medium.

9. The MICR reader according to claim 8, wherein the correction member includes:
   a first feeder, adapted to feed the paper in a first direction; and
   a second feeder, adapted to feed the paper in the first direction, and disposed at an upstream side of the first feeder in the first direction.

10. A method of reading a MICR (magnetic ink character recognition) character printed on a medium fed in a first direction by a MICR reading head, comprising:
  detecting an end portion in a second direction perpendicular to the first direction of the medium; and
  moving the MICR reading head to a predetermined position at a predetermined distance from the detected end portion.

11. The method according to claim 10, further comprising bringing the medium into close contact with the MICR reading head by a pressure applier.

12. The method according to claim 11, further comprising preventing the pressure applier from coming into contact with the MICR reading head when the MICR reading head is moved.

13. The method according to claim 10, further comprising correcting a skew of the medium.

14. A MICR character recognition device to read MICR characters located at a predetermined distance from an edge of a paper fed in a first direction, comprising:
  a sensor to detect location of the edge of the paper in a second direction perpendicular to the first direction;
  a MICR reading head to read MICR characters located at the predetermined distance from the edge of the paper fed in the first direction, the MICR reading head being movable in the second direction based on the detected location of the edge of the paper; and
  a roller disposed between the sensor and the MICR reading head' that presses the paper towards the MICR reading head to read the MICR characters, but does not press the paper toward the MICR reading head while the MICR reading head moves in the second direction.

* * * * *

UNITED STATES PATENT AND TRADEMARK OFFICE
CERTIFICATE OF CORRECTION

| | | |
|---|---|---|
| PATENT NO. | : 7,810,728 B2 | Page 1 of 1 |
| APPLICATION NO. | : 11/356086 | |
| DATED | : October 12, 2010 | |
| INVENTOR(S) | : Masayoshi Kawai et al. | |

It is certified that error appears in the above-identified patent and that said Letters Patent is hereby corrected as shown below:

Column 6, Line 12, delete "head'that'" and insert --head that--, therefor.

Signed and Sealed this
Twenty-eighth Day of December, 2010

David J. Kappos
*Director of the United States Patent and Trademark Office*